US008448598B2

(12) United States Patent
Pei

(10) Patent No.: US 8,448,598 B2
(45) Date of Patent: May 28, 2013

(54) COATING DEVICE

(75) Inventor: Shao-Kai Pei, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 295 days.

(21) Appl. No.: 12/951,083

(22) Filed: Nov. 22, 2010

(65) Prior Publication Data

US 2011/0185968 A1 Aug. 4, 2011

(30) Foreign Application Priority Data

Jan. 29, 2010 (TW) .................................. 99102547

(51) Int. Cl.

*B05B 5/025* (2006.01)
*B05C 5/02* (2006.01)
*B23C 16/00* (2006.01)
*B23C 16/50* (2006.01)

(52) U.S. Cl.

USPC ................ 118/623; 118/723 R; 118/723 MR; 118/723 MA; 118/723 MP; 118/730; 118/725

(58) Field of Classification Search

USPC ............... 118/623, 723 R, 723 MR, 723 MA, 118/723 MP, 725, 730, 719

See application file for complete search history.

(56) References Cited

U.S. PATENT DOCUMENTS

| | | | | |
|---|---|---|---|---|
| 4,422,407 | A * | 12/1983 | Bessot et al. | 118/723 E |
| 4,615,294 | A * | 10/1986 | Scapple et al. | 118/719 |
| 5,378,284 | A * | 1/1995 | Geisler et al. | 118/723 MR |
| 2010/0219160 | A1* | 9/2010 | Schmidt et al. | 118/723 R |

* cited by examiner

*Primary Examiner* — Dah-Wei Yuan
*Assistant Examiner* — Binu Thomas
(74) *Attorney, Agent, or Firm* — Altis Law Group, Inc.

(57) ABSTRACT

A coating device includes a case, a reaction module, and a cover. The case defines a reaction cavity. Receiving plates are positioned on an inner surface of the reaction cavity. The reaction module is received in the reaction cavity and capable of being rotated in the reaction cavity. The reaction module includes an outer housing and an inner housing. The outer housing includes electric magnets and waveguides. The electric magnets are positioned around the outer housing. Waveguide channels are defined in the outer housing. Each waveguide is partially received in a corresponding waveguide channel. The inner housing is received in the outer housing. A first receiving chamber is defined between the inner and outer housings. A second receiving chamber is defined in the inner housing. The first receiving chamber communicates with the second receiving chamber and the reaction cavity. The cover covers the opening end.

20 Claims, 4 Drawing Sheets

COATING DEVICE

BACKGROUND

1. Technical Field

The present disclosure is related to coating devices, especially to a coating device using electron cyclotron resonance (ECR).

2. Description of Related Art

A typical coating device with electron cyclotron resonance (ECR) for coating substrates obtains ionized particles through microwaves forming standing waves on the substrates to excite reaction gas in a reaction chamber. Two sets of electrical magnets are positioned around the reaction chamber to convolute electrons to speed obtaining of the ionized particles. Therefore, the ionized reaction gas forms films on the substrates. However, the typical coating device can only coat one substrate at one time, and cannot satisfy batch coating.

Therefore, it is desirable to provide a new coating device which can overcoming the foregoing problems.

DETAILED DESCRIPTION

Figure 1:
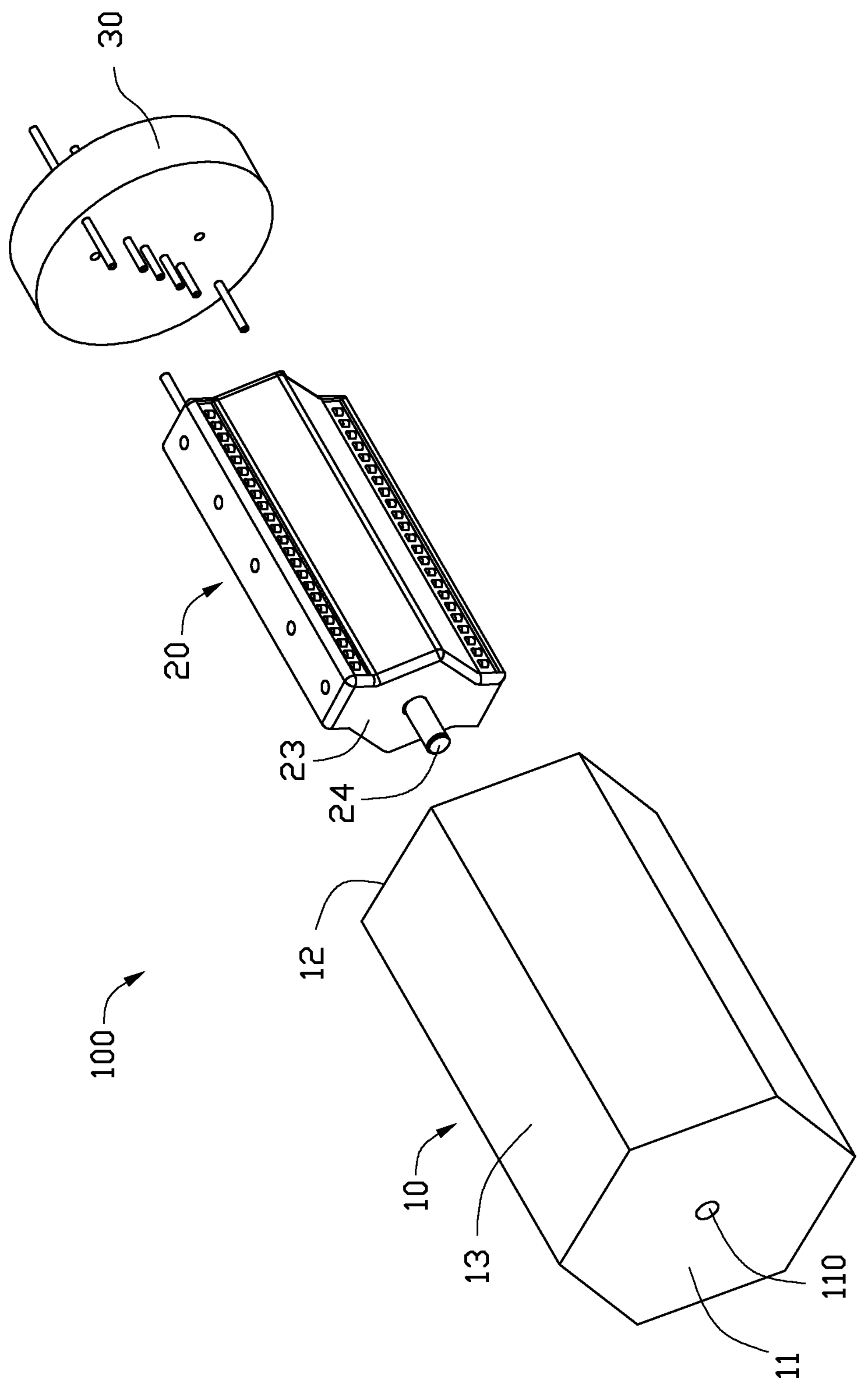
FIG. 1 is an exploded perspective view of an embodiment of a coating device.
Figure 2:
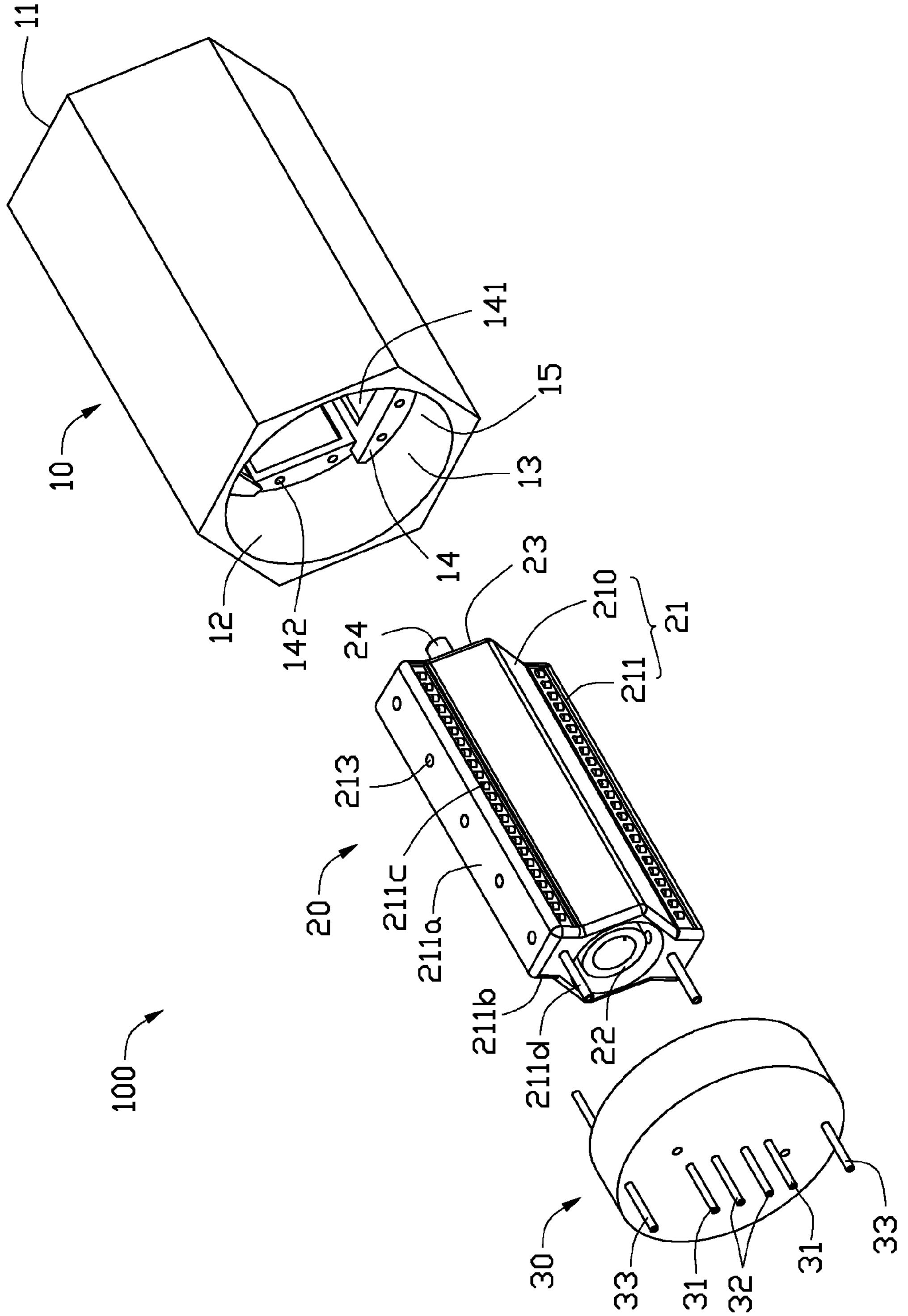
FIG. 2 is an exploded perspective view of FIG. 1 which is viewed from another angle.

Referring to FIGS. 1 and 2, an embodiment of a coating device 100 includes a case 10, a reaction module 20 and a cover 30. The case 10 is shaped as a hexagonal prism and includes a bottom wall 11, an open end 12, a side wall 13, a plurality of receiving plates 14 and a cylindrical reaction cavity 15. The bottom wall 11 and the open end 12 are located on two opposite ends of the case 10. The center of the bottom wall 11 defines a shaft hole 110. The side wall 13 bounds vertically around the periphery of the bottom wall 11 and defines the reaction cavity 15. The receiving plates 14 border around the periphery of the case 10 and are positioned inside the side wall 13. A receiving recess 141 is defined in each receiving plate 14 for receiving a substrate to be plated. A plurality of heating sticks 142 are positioned in the receiving plates 14 along a lengthwise direction of the case 10 for controlling crystal coating films through heating the substrates. In this embodiment, the receiving plates 14 and the side wall 13 are formed integrally. There are a variety of methods for fastening the plates receiving 14 to the case 10, such as through screws, magnets, or latches.

The reaction module 20 includes an outer housing 21, an inner housing 22, a bottom plate 23 and a rotation shaft 24. The bottom plate 23 is positioned on one end of the reaction module 20, and the rotation shaft 24 is substantially vertically fastened to the bottom plate 23. The reaction module 20 is rotationally connected to the case 10 through the engagement of the rotation shaft 24 with the shaft hole 110.

The outer housing 21 includes a housing body 210 and two working units 211. The housing body 210 is also shaped as a hexagonal prism, and the working units 211 are formed on two opposite sides of the housing body 210. Each working unit 211 includes a first side wall 211*a*, two second side walls 211*b*, a plurality of electric magnets 211*c*, and a waveguide 211*d*. The first side walls 211*a* are positioned on the two opposite sides of the housing body 210, and each two opposite second side walls 211*b* are positioned on two opposite sides of each first side wall 211*a*. A plurality of first spraying holes 213 is defined in line on the first side wall 211*a* along a lengthwise direction of the housing body 210. The electrical magnets 211*c* are positioned on another two sides of the first side wall 211*a* and arranged along a lengthwise direction of the housing body 210, so that the magnetic field generated by the electrical magnets 211*c* is substantially parallel to the spraying direction of the first spraying holes 213. The first spraying holes 213 are positioned between the electric magnets 211*c*.

Figure 3:
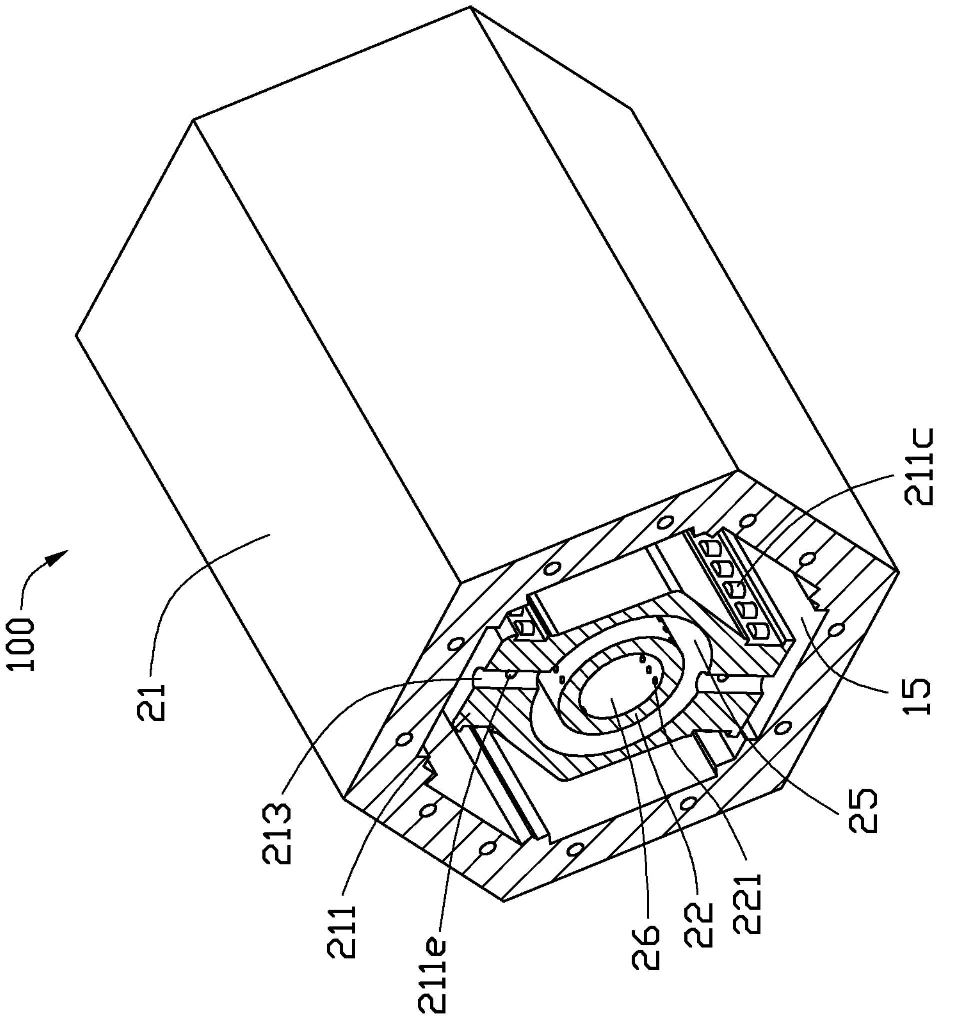
FIG. 3 is a cross sectional, assembled view of the coating device of FIG. 1.

Referring to FIG. 3, a waveguide channel 211*e* is defined in each of the first side walls 211*a* along the lengthwise direction of the housing body 210, and communicates with the first spraying holes 213. The waveguide channel 211*e* is positioned between the electric magnets 211*c*. One portion of each waveguide 211*d* is received in a corresponding waveguide channel 211*e*, and another portion of the waveguide 211*d* extends out of a corresponding second side wall 211*b* away the rotation shaft 24. The waveguides 211*d* are configured to introduce microwaves into the waveguide channels 211*e*. In this embodiment, the outer diameter of the waveguide 211*d* is included and is substantially the same as the inner diameter of the waveguide channel 211*e*. The waveguide 211*d* is substantially coaxial with the waveguide channel 211*e*.

The inner housing 22 is substantially shaped as an annular cylinder, and is received in the outer cylinder 21 with one end covered by the bottom plate 23. A plurality of second spraying holes 221 is defined on the inner housing 22, and arranged in one or more rows substantially axially to the inner housing 22. In this embodiment, the second spraying holes 221 are included and are substantially arranged in symmetrical rows of four on the inner housing 22, and evenly spaced from each other. A first receiving chamber 25 is defined between the inner housing 22 and the outer housing 21, and communicates with the reaction cavity 15 through the first spray holes 213. A second receiving chamber 26 is defined in the inner housing 22, and communicates with the first receiving chamber 25 through the second spray holes 221.

Figure 4:
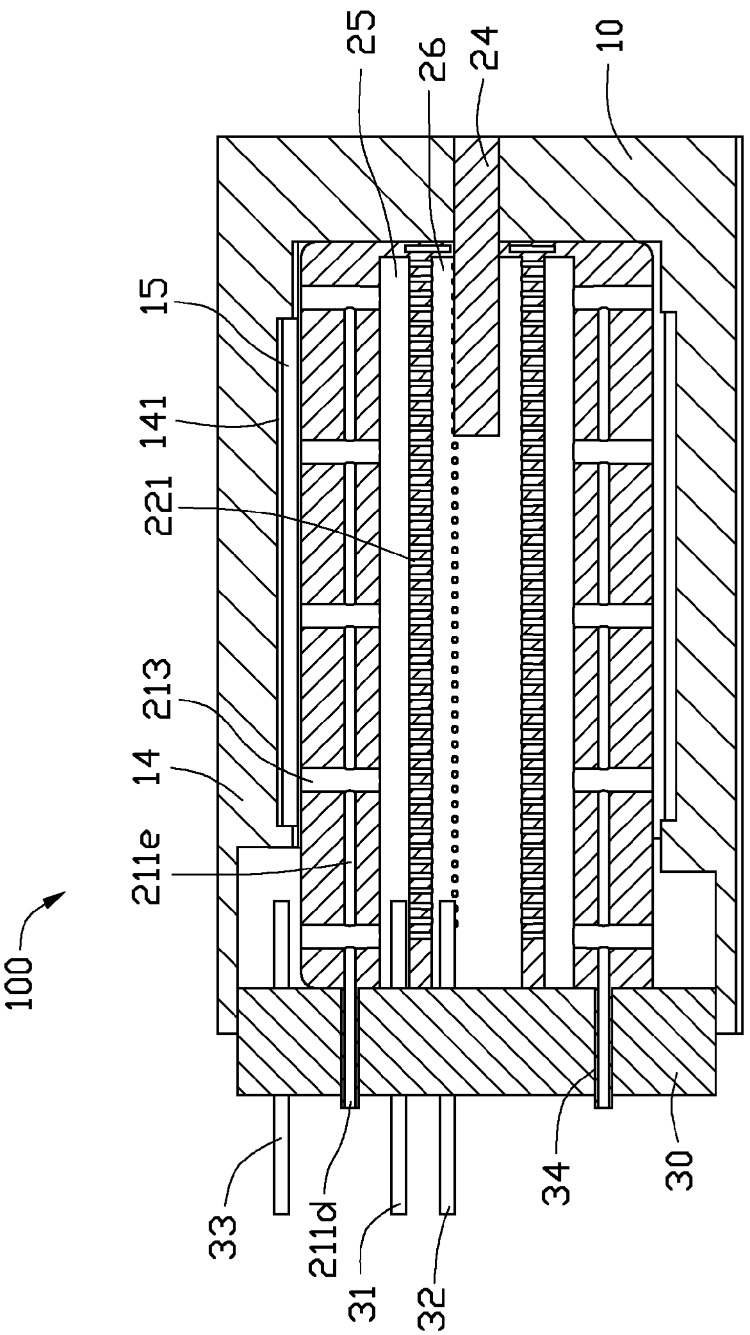
FIG. 4 is another cross sectional, assembled view of the coating device of FIG. 1.

Referring to FIG. 4, the cover 30 is received inside the open end 12 of the case 10, to cover the first receiving chamber 25, the second receiving chamber 26 and the reaction cavity 15. The cover 30 includes two first inlets 31, two second inlets 32 and two outlets 33. The two first inlets 31 communicate with the first receiving chamber 25 to transport ionized reaction gas to the first receiving chamber 25. The two second inlets 32 communicate with the second receiving chamber 26, to transport noble gas to the second receiving chamber 26. The two outlets 33 communicate with the reaction cavity 15 to exhaust gas from the reaction module 20. Two through holes 34 are defined on the cover 30, corresponding to the waveguides 211*d* of the outer housing 21, to fasten the waveguides 211*d* on the cover 30.

In operation, substrates are positioned in the receiving recesses 141 of the receiving plates 14 for coating, and the cover 30 is closed. The outlets 33 exhaust air from the case 10 during the coating operation. The rotation shaft 24 rotates the reaction module 20, and the heating sticks 142 are heated. Noble gas is transported to the second receiving chamber 26 through the second inlets 32, and ionized reaction gas is transported to the first receiving chamber 25 through the first inlets 31. Microwaves are introduced to the microwave channels 211*e* through the waveguides 211*d*. The electric magnets 211*c* are powered to generate magnetic fields resonating with the microwaves. The noble gas is sprayed from the second receiving chamber 26 into the first receiving chamber 25 through the second spraying holes 221, and mixed with the ionized reaction gas. The mixed gas enters the first spraying holes 213. The microwaves in the intersection of the microwave channel 211*e* and the first spraying holes 213 excite the mixed gas. The electric magnets 211*c* generate a magnetic field and the generated magnetic field enables the electron cyclotron resonance (ECR) of the ionized mixed gas to obtain ionized particles with high density. The fully reacted ionized particles are sprayed out from the first spraying holes 213 through air flow and the magnetic field, and distributed to the substrates to provide even plated films.

The coating device of the present disclosure provides coating by multiple substrates in batches, and increases efficiency for coating.

What is claimed is:

1. A coating device, comprising:

a case comprising a bottom wall and an opening end at two opposite ends thereof and defining a reaction cavity;

a plurality of receiving plates positioned on an inner surface of the reaction cavity and configured to receive substrates;

a reaction module received in the reaction cavity and capable of being rotated in the reaction cavity, the reaction module comprising an outer housing and an inner housing, wherein the outer housing comprises a plurality of electric magnets and a plurality of waveguides, the electric magnets are positioned around the outer housing, a plurality of waveguide channels are defined in the outer housing, one portion of each waveguide is received in a corresponding waveguide channel, another portion of the waveguide extends out of the outer housing, the inner housing is shaped as an annular cylinder and received in the outer housing, a first receiving chamber is defined between the inner and outer housings, a second receiving chamber is defined in the inner housing, a plurality of first spraying holes are defined in the outer housing and communicates the first receiving chamber to the reaction cavity, each waveguide channel communicates with corresponding first spraying holes, a plurality of second spraying holes are defined in the inner housing and communicates the second receiving chamber to the first receiving chamber, and the second spraying holes are arranged in symmetrical rows of four in the inner housing and evenly spaced from each other; and a cover covering the opening end and comprising a plurality of first inlets, a plurality of second inlets, and a plurality of outlets, the first inlets communicating with the first receiving chamber, the second inlets communicating with the second receiving chamber, the outlets communicating with the reaction cavity.

2. The coating device of claim 1, wherein the reaction cavity is cylindrical shaped.

3. The coating device of claim 1, wherein the case comprises a plurality of heating sticks positioned in the receiving plates.

4. The coating device of claim 1, wherein each receiving plate defines a receiving recess configured to receive one of the substrates.

5. The coating device of claim 1, wherein the reaction module comprises a bottom plate and a rotation shaft, the outer and inner housings are positioned on the bottom plate, the rotation shaft is positioned on the bottom plate and vertical to the bottom plate, the case defines a shaft hole in the bottom wall, and the rotation shaft passes through the shaft hole.

6. The coating device of claim 1, wherein the outer housing comprises a housing body and two working units, each working unit comprises a first side wall and one of the waveguides, the two first side walls of the two working units are position on two opposite sides of the housing body along a lengthwise direction of the outer housing, the electrical magnets are positioned on two opposite sides of each first side wall and arranged along the lengthwise direction of the outer housing, and one of the waveguide channels is defined in each first side wall along the lengthwise direction of the outer housing and positioned between the electric magnets.

7. The coating device of claim 6, wherein the first spraying holes are defined in line in each first side wall along the lengthwise direction of the outer housing and positioned between the electric magnets.

8. The coating device of claim 6, wherein each working unit comprises two second side walls, the two second side walls are positioned on another two opposite sides of the first side wall, the waveguide extends out of a corresponding second side wall, and the electric magnets are positioned between the second side walls.

9. The coating device of claim 1, wherein the case is shaped as a hexagonal prism.

10. The coating device of claim 1, wherein the cover defines a plurality of through holes, and each waveguide passes through a corresponding through hole.

11. The coating device of claim 6, wherein the housing body is shaped as a hexagonal prism.

12. A coating device, comprising:

a case comprising a bottom wall and an opening end at two opposite ends thereof and defining a reaction cavity;

a plurality of receiving plates positioned on an inner surface of the reaction cavity and configured to receive substrates;

a reaction module received in the reaction cavity and capable of being rotated in the reaction cavity, the reaction module comprising an outer housing and an inner housing, wherein the outer housing comprises a housing body, two first side walls, a plurality of electric magnets and a plurality of waveguides, the first side walls are positioned on two opposite sides of the housing body along a lengthwise direction of the outer housing, the electric magnets are positioned around the outer housing on another two opposite sides of each first side wall and arranged along the lengthwise direction of the outer housing, a plurality of waveguide channels is defined in the outer housing, one of the waveguide channels is defined in each first side wall along the lengthwise direction of the outer housing and positioned between the electric magnets arranged on two opposite sides of each first side wall, each waveguide is partially received in a corresponding waveguide channel, the inner housing is received in the outer housing, a first receiving chamber is defined between the inner and outer housings, a second receiving chamber is defined in the inner housing, and the second receiving chamber communicates with the first receiving chamber and the reaction cavity; and a cover covering the opening end and comprising a plurality of first inlets, a plurality of second inlets, and a plurality of outlets, the first inlets communicating with the first receiving chamber, the second inlets communicating with the second receiving chamber, and the outlets communicating with the reaction cavity.

13. The coating device of claim 12, wherein the reaction module comprises a bottom plate and a rotation shaft, the outer and inner housings are positioned on the bottom plate, the rotation shaft is positioned on the bottom plate and vertical to the bottom plate, the case defines a shaft hole in the bottom wall, and the rotation shaft passes through the shaft hole.

14. The coating device of claim 12, wherein the outer housing comprises four second side walls, each two second side walls are positioned on another two opposite sides of the first side wall, each waveguide extends out of a corresponding second side wall, and the electric magnets are positioned between the second side walls.

15. The coating device of claim 12, wherein the outer housing defines a plurality of first spraying holes in line in each first side wall along the lengthwise direction of the outer housing and positioned between the electric magnets, and the first spraying holes communicate the first receiving chamber to the reaction cavity.

16. The coating device of claim 12, wherein the inner housing defines a plurality of second spraying holes, and the second spraying holes communicate the second receiving chamber to the first receiving chamber.

17. The coating device of claim 16, wherein the second spraying holes are arranged in symmetrical rows of four in the inner housing and evenly spaced from each other.

18. A coating device, comprising:

a case comprising a bottom wall and an opening end at two opposite ends thereof and defining a reaction cavity;

a plurality of receiving plates positioned on an inner surface of the reaction cavity and configured to receive substrates;

a reaction module received in the reaction cavity and capable of being rotated in the reaction cavity, the reaction module comprising an outer housing and an inner housing, wherein:

the outer housing comprises a plurality of electric magnets and two waveguides, the electric magnets are positioned around the outer housing, two waveguide channels are defined in the outer housing, one portion of each waveguide is received in a corresponding waveguide channel, another portion of each waveguide extends out of the outer housing; and the inner housing is received in the outer housing, a first receiving chamber is defined between the inner and outer housings, a second receiving chamber is defined in the inner housing, a plurality of first spraying holes is defined in the outer housing and communicates the first receiving chamber to the reaction cavity, each waveguide channel communicates with corresponding first spraying holes, and a plurality of second spraying holes is defined in the inner housing and communicates the second receiving chamber to the first receiving chamber; and a cover covering the opening end and comprising a plurality of first inlets, a plurality of second inlets, and a plurality of outlets, the first inlets communicating with the first receiving chamber, the second inlets communicating with the second receiving chamber, the outlets communicating with the reaction cavity;

wherein when substrates are positioned in the receiving plates for coating, the cover is closed, the outlets exhaust air from the case during the coating operation, noble gas is transported to the second receiving chamber through the second inlets, ionized reaction gas is transported to the first receiving chamber through the first inlets, microwaves are introduced to the waveguide channels through the waveguide, the electric magnets are powered to generate magnetic fields resonating with the microwaves, the noble gas is sprayed from the second receiving chamber into the first receiving chamber through the second spraying holes, and mixed with the ionized reaction gas, the mixed gas enters the first spraying holes, the microwaves in the intersection of the waveguide channels and the first spraying holes excite the mixed gas, the electric magnets generate a magnetic field and the generated magnetic field enables the electron cyclotron resonance (ECR) of the ionized mixed gas to obtain ionized particles with high density, and the fully reacted ionized particles are sprayed out from the first spraying holes through air flow and the magnetic field, and distributed to the substrates received in the receiving plates to provide even plated films.

19. The coating device of claim 18, wherein the outer housing comprises a housing body and two working units, each working unit comprises a first side wall and one of the waveguides, the two first side walls of the two working units are positioned on two opposite sides of the housing body along a lengthwise direction of the outer housing, the electrical magnets are positioned on two opposite sides of each first side wall and arranged along the lengthwise direction of the outer housing, and one of the waveguide channels is defined in each first side wall along the lengthwise direction of the outer housing and positioned between the electric magnets.

20. The coating device of claim 19, wherein each working unit comprises two second side walls, the two second side walls are positioned on another two opposite sides of each first side wall, each waveguide extends out of a corresponding second side wall, and the electric magnets are positioned between the second side walls.

* * * * *